United States Patent
Fukami

(10) Patent No.: US 12,224,470 B2
(45) Date of Patent: Feb. 11, 2025

(54) CELL STACK DEVICE, MODULE, AND MODULE HOUSING DEVICE

(71) Applicant: KYOCERA Corporation, Kyoto (JP)

(72) Inventor: Norimitsu Fukami, Kirishima (JP)

(73) Assignee: Kyocera Corporation, Kyoto (JP)

( * ) Notice: Subject to any disclaimer, the term of this patent is extended or adjusted under 35 U.S.C. 154(b) by 632 days.

(21) Appl. No.: 17/433,799

(22) PCT Filed: Feb. 26, 2020

(86) PCT No.: PCT/JP2020/007712
§ 371 (c)(1),
(2) Date: Aug. 25, 2021

(87) PCT Pub. No.: WO2020/175540
PCT Pub. Date: Sep. 3, 2020

(65) Prior Publication Data
US 2022/0140380 A1    May 5, 2022

(30) Foreign Application Priority Data

Feb. 27, 2019    (JP) .................................. 2019-034413

(51) Int. Cl.
*H01M 8/2475*    (2016.01)
*H01M 8/0247*    (2016.01)

(52) U.S. Cl.
CPC ....... *H01M 8/2475* (2013.01); *H01M 8/0247* (2013.01)

(58) Field of Classification Search
CPC ............. H01M 8/2475; H01M 8/0247; H01M 8/2465; Y02E 60/50
See application file for complete search history.

(56) References Cited

U.S. PATENT DOCUMENTS

2010/0203414 A1*   8/2010   Ooshima ............. H01M 8/0247
                                                                                  429/458
2017/0033394 A1*   2/2017   Yamauchi ........... H01M 8/2425

FOREIGN PATENT DOCUMENTS

JP      2010-129270 A    6/2010
JP      2015118854 A *    6/2015
JP      2017-069093 A    4/2017

* cited by examiner

*Primary Examiner* — Muhammad S Siddiquee
(74) *Attorney, Agent, or Firm* — Procopio, Cory, Hargreaves & Savitch LLP

(57) ABSTRACT

A cell stack device includes a cell stack constituted by arraying and electrically connecting cells, and a pair of conductive members respectively located on two ends of the cell stack in an array direction of the cells and electrically connected to the cells. Each conductive member includes a power receiving portion facing the cell stack and a current extraction portion extending from the power receiving portion. The current extraction portion includes an extraction portion body and a connecting portion to be connected to an external device. When a direction in which the current extraction portion extends from the power receiving portion is defined as a first direction and a direction orthogonal to the first direction is defined as a second direction, the extraction portion body includes, in the second direction, a first part shorter in length than an average length of the extraction portion body.

10 Claims, 12 Drawing Sheets

CELL STACK DEVICE, MODULE, AND MODULE HOUSING DEVICE

CROSS-REFERENCE TO RELATED APPLICATION(S)

This application is a national stage application of International Application No. PCT/JP2020/007712, filed on Feb. 26, 2020, which designates the United States, the entire contents of which are herein incorporated by reference, and which is based upon and claims the benefit of priority to Japanese Patent Application No. 2019-034413 filed on Feb. 27, 2019, the entire contents of which are herein incorporated by reference.

TECHNICAL FIELD

The present disclosure relates to a cell stack device, a module, and a module housing device.

BACKGROUND ART

In recent years, fuel cell devices have been proposed as next-generation energy sources (refer to, for example, Patent Document 1).

Such fuel cell devices include a cell stack device in which a plurality of fuel cells are electrically connected to each other, and a manifold for supplying a gas to the plurality of fuel cells. The cell stack device disclosed in Patent Document 1 includes a plurality of fuel cells that are arrayed and a conductive member disposed at both end portions in an array direction of the plurality of fuel cells. The lower end portion of the fuel cell and the lower end portion of the conductive member are fixed to the manifold.

The conductive member includes a power receiving portion bonded to an end portion current collector member, and a current extraction portion extending outward from the power receiving portion along the array direction of the plurality of fuel cells.

CITATION LIST

Patent Literature

Patent Document 1: JP 2010-129270 A

SUMMARY OF INVENTION

A cell stack device of the present disclosure includes a cell stack constituted by arraying and electrically connecting cells, and a pair of conductive members respectively located at two ends of the cell stack in an array direction of the cells and electrically connected to the cells. Each of the pair of conductive members includes a power receiving portion facing the cell stack and a current extraction portion extending from the power receiving portion. The current extraction portion includes an extraction portion body and a connecting portion to be connected to an external device. When a direction in which the current extraction portion extends from the power receiving portion is defined as a first direction and a direction orthogonal to the first direction is defined as a second direction, the extraction portion body includes, in the second direction, a first part shorter in length than an average length of the extraction portion body.

A module of the present disclosure includes a housing container and the cell stack device described above housed in the housing container.

A module housing device of the present disclosure includes an external case and the module described above housed in the external case.

DESCRIPTION OF EMBODIMENTS

Cell Stack Device

Figure 1:
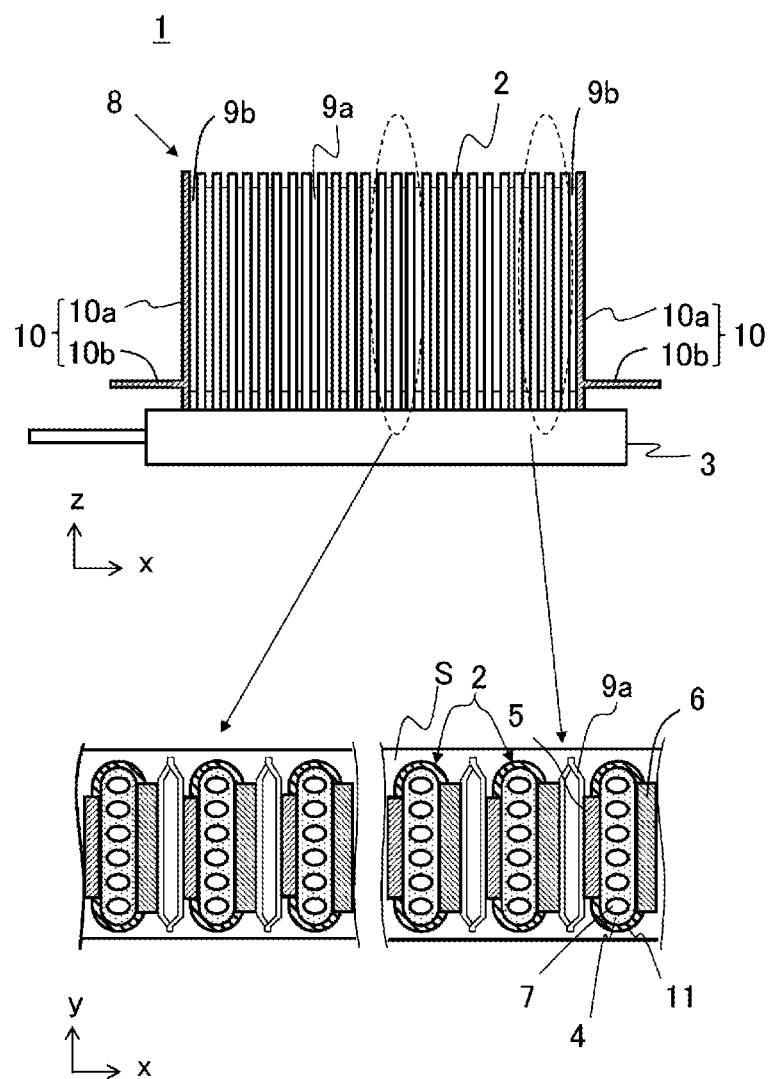
FIG. 1 illustrates, in an upper part, a schematic side view of an example of a cell stack device, and, in a lower part, an enlarged horizontal cross-sectional view of parts of portions surrounded by broken lines of the cell stack device illustrated in the upper part.

An upper part of FIG. 1 is a schematic side view of an example of a cell stack device 1. A lower part of FIG. 1 is an enlarged horizontal cross-sectional view of parts of portions surrounded by broken lines of the cell stack device 1 in the upper part of FIG. 1. In the upper and lower parts of FIG. 1, the same members are denoted by the same reference numerals. In the following figures, the same reference numerals will be used for the same members. Note that the correspondence between each portion surrounded by the dotted line in the upper part of FIG. 1 and a corresponding figure in the lower part of FIG. 1 is indicated by an arrow.

The cell stack device 1 is housed in the housing container together with a fuel processing device or the like as described below to form a module.

The cell stack device 1 includes cells 2 and a gas tank 3. A lower end portion of each of the cells 2 in the length direction z is bonded and fixed to an opening portion of the gas tank 3 by a sealing material S. The gas tank 3 supplies a gas to each of the cells 2.

Each of the cells 2 includes a first electrode layer, a solid electrolyte layer, and a second electrode layer on a first flat surface of a conductive support body 4 that is columnar and has a pair of opposing first and second flat surfaces. An element portion 5 is a portion where the solid electrolyte is interposed between the first electrode layer and the second electrode layer in the cell 2. The cell 2 includes an interconnector 6 on the second flat surface of the conductive support body 4. The conductive support body 4 includes, therein, a plurality of gas flow passages 7 that allow the gas to flow to the element portion 5. Hereinafter, the conductive support body 4 may be abbreviated as a support body 4.

A cell stack 8 includes a plurality of the cells 2 arrayed upright and a current collector member 9a electrically connecting each of the two adjacent cells 2 in series among the plurality of cells 2. The direction in which the plurality of cells 2 is arrayed is referred to as an array direction x. In FIG. 1, the first flat surface of each of the cells 2 has a rectangular shape formed by two pairs of facing sides, and among the two pairs of sides, the direction in which the short sides extend is defined as a width direction y, and the direction in which the long sides extend is defined as a length direction z. The width direction y and the length direction z of the cell 2 may be collectively referred to as the surface direction of the cell 2.

The cell stack device 1 includes an end portion current collector member 9b on each of the two ends in the array direction x of the cell stack 8 and further includes a conductive member 10 on the outer side of the end portion current collector member 9b. The lower end of the conductive member 10 in the length direction z may be fixed to the gas tank 3 by the sealing material S. The conductive member 10 may be integrated with the end portion current collector member 9b.

Hereinafter, unless otherwise noted, the cell 2 will be described as a fuel cell in which a first electrode layer in contact with the support body 4 is a fuel electrode, and a second electrode layer located on the outer side of the cell 2 is an air electrode. Note that the first electrode layer may be an air electrode and the second electrode layer may be a fuel electrode.

The cell 2 need not necessarily form the first electrode layer, and the support body 4 may be used as the fuel electrode or the air electrode. For example, the cell 2 may include the solid electrolyte layer and the second electrode layer on the first flat surface of the support body 4.

The cell 2 may be, for example, a solid oxide fuel cell. The solid oxide fuel cell has a high power generation efficiency and can reduce the size of a module housing device described below. The solid oxide fuel cell can perform a load following operation, and can follow the varying load required for, for example, a fuel cell for home use.

Descriptions of each member constituting the cell stack device 1 illustrated in FIG. 1 will be given below.

A material commonly known as a fuel electrode may be used for the fuel electrode. The fuel electrode may be formed of a porous conductive ceramic, for example, stabilized zirconia, and Ni and/or NiO. Stabilized zirconia is $ZrO_2$ containing calcium, magnesium, rare earth elements, and the like in solid solution, and also includes partially stabilized zirconia.

The solid electrolyte layer is an electrolyte that bridges ions between the electrodes. The solid electrolyte layer has a gas blocking property such that the fuel gas and an oxygen-containing gas such as air do not mix. The material of the solid electrolyte layer is not particularly limited as long as it is an electrolyte having a gas blocking property. The material of the solid electrolyte layer may be, for example, $ZrO_2$ containing equal to or more than 3 mol % and equal to or less than 15 mol % of rare earth elements in solid solution.

A material commonly used as an air electrode may be used for the air electrode. The air electrode may be, for example, a conductive ceramic containing so-called $ABO_3$ perovskite oxide. The air electrode has gas permeability. The open porosity of the air electrode may be equal to or more than 20%, particularly, in the range from 30% to 50%.

The material of the interconnector 6 may be a conductive ceramic. The interconnector 6 is in contact with the fuel gas such as a hydrogen-containing gas and the oxygen-containing gas such as air. As such, the material of the interconnector 6 may be a lanthanum chromite-based perovskite oxide ($LaCrO_3$-based oxide) having reduction resistance and oxidation resistance. The interconnector 6 is dense so that the fuel gas flowing through the gas flow passages 7 formed in the support body 4 and the oxygen-containing gas flowing outside the cell 2 do not mix. The interconnector 6 may have a relative density equal to or more than 93%, particularly, equal to or more than 95%.

In the cell 2 illustrated in FIG. 1, the support body 4 has gas permeability and electrical conductivity. Since the support body 4 has gas permeability, the fuel gas flowing through the gas flow passages 7 of the support body 4 can reach the first electrode layer of the fuel electrode. Since the support body 4 has electrical conductivity, electricity generated by the element portion 5 can be collected through the interconnector 6. The material of the support body 4 may be, for example, a conductive ceramic, a cermet, or the like. In a case in which the support body 4 is formed by co-firing with the fuel electrode or the solid electrolyte layer, the material of the support body 4 may be a material containing an iron group metal component and a specific rare earth oxide. The open porosity of the support body 4 may be, for example, equal to or more than 30%, particularly in the range from 35 to 50%. Since the support body 4 has such an open porosity, the fuel gas flowing through the gas flow passages 7 of the support body 4 can reach the first electrode layer serving as the fuel electrode. The electrical conductivity of the support body 4 may be, for example, equal to or more than 300 S/cm, particularly, equal to or more than 440 S/cm.

In the cell 2 illustrated in FIG. 1, the columnar support body 4 is an elongated plate-shaped piece extending in the longitudinal direction z of the cell 2, and has a hollow flat plate shape including a pair of opposing first and second flat surfaces and a pair of side surfaces each having a semicircular shape. The support body 4 includes a covering layer 11 having a gas blocking property, which is formed of, for example, a material that is the same as or similar to that of the solid electrolyte layer at a part such as the side surface not including the element portion 5 and the interconnector 6. The lower end portion of the cell 2 in the length direction z is fixed to the opening portion of the gas tank 3 by the sealing material S such as an insulating glass sealing material having excellent thermal resistance, for example. The gas flow passages 7 of the support body 4 communicate with a fuel gas chamber inside the gas tank 3.

The current collector member 9a is disposed between adjacent cells 2 of the cells 2. The current collector member 9a electrically connects each two adjacent cells 2 in series. The end portion current collector members 9b are respectively disposed at the two ends of the cell stack 8 in the array direction x. The current collector members 9a and the end portion current collector members 9b are bonded to the cells 2 with a conductive adhesive. As the material of the current collector members 9a and the end portion current collector members 9b, metals or alloys having elasticity may be used, or felts of metal fibers or alloy fibers may be used. The felts of metal fibers or alloy fibers may be surface treated as needed. The current collector members 9a and the end portion current collector members 9b may be formed of members made of the same material and having the same shape. For each end portion current collector member 9b, a member made of a material more easily deformed than that of the current collector member 9a and having a shape more easily deformed than that of the current collector member 9a may be used.

Figure 2:
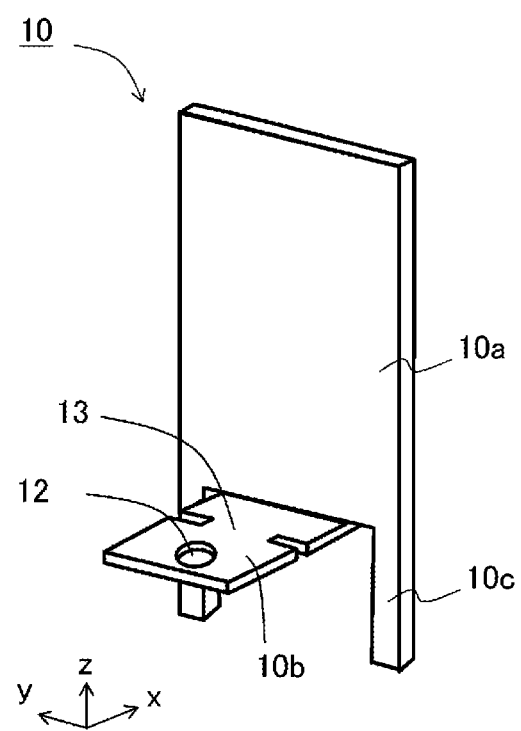
FIG. 2 is a perspective view illustrating an example of a conductive member.

FIG. 2 is a perspective view illustrating an example of the conductive member 10. The conductive member 10 includes a power receiving portion 10a having a plate shape bonded to the end portion current collector member 9b, a current extraction portion 10b having a flat plate shape extending outward from the power receiving unit 10a in the array direction x of the cells 2, and an anchoring portion 10c fixed at the lower end thereof to the gas tank 3. Note that in FIG. 1, each of the conductive members 10 is illustrated by a hatched line portion in order to facilitate understanding of the conductive member 10.

The current extraction portion 10b includes a through hole 12 at an end portion far from the power receiving portion 10a. A current extraction cable from an external device (not illustrated) is connected to the through hole 12 by a bolt or the like. Hereinafter, the current extraction cable may be simply referred to as a cable.

In the cell stack device 1 such as that described above, the larger the cross-sectional area of the cables and the current extraction portions 10b are, the greater the current flowing from the cell stack device 1 can be. When the cross-sectional area of the current extraction portions 10b is large, the rigidity of the current extraction portions 10b increases, and consequently, for example, displacement of the cells 2 or displacement of the arrangement of the cell stack device 1 is easily transferred to the cables via the current extraction portions 10b. As a result, there is a concern that the displacement of the cells 2 or the displacement of the cell stack device 1 affects the sealing property and the like around the cables in the housing container housing the cell stack device 1 and the like. In addition, there is a concern that displacement of the arrangement of the cables is transferred to the cell stack device 1 and the cells 2 via the current extraction portions 10b, and consequently the sealing property and the like of the sealing material S that fixes the conductive members 10 and the cells 2 is affected. When the sealing property of the sealing material S or the sealing property around the cables deteriorates, there is a concern that the reliability of the cell stack device 1 is affected.

Figure 3:
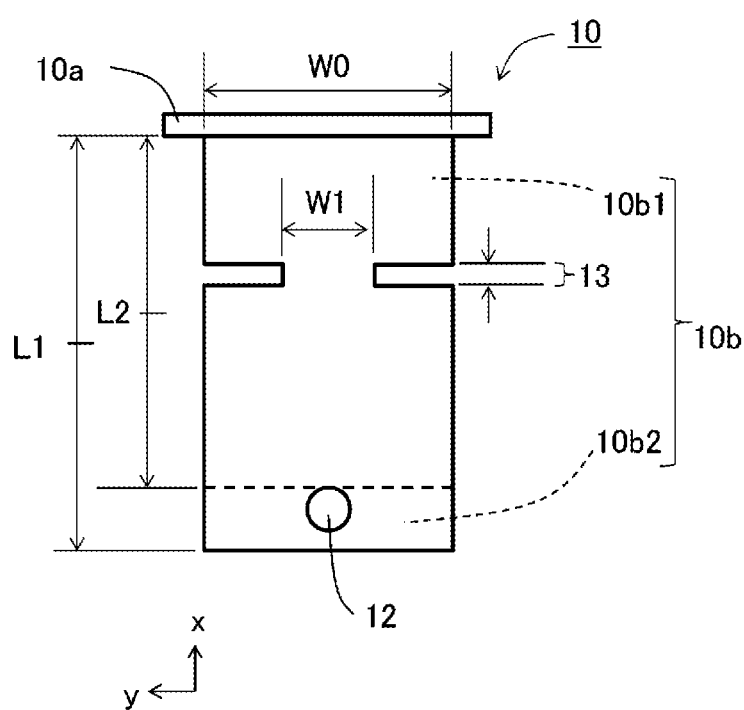
FIG. 3 is a plan view illustrating an example of a current extraction portion.

FIG. 3 is a plan view illustrating an example of the current extraction portion 10b. The current extraction portion 10b illustrated in FIG. 3 includes an extraction portion body 10b1 and a connecting portion 10b2 including the through hole 12. The connecting portion 10b2 is located farther from the power receiving portion 10a than the extraction portion body 10b1. In other words, the extraction portion body 10b1 is a part located between the through hole 12 and a boundary portion of the current extraction portion 10b, the boundary portion being located between the current extraction portion 10b and the power receiving portion 10a. Hereinafter, the boundary portion of the current extraction portion 10b, the boundary portion being located between the current extraction portion 10 and the power receiving portion 10a, may be simply referred to as the boundary portion.

The extraction portion body 10b1 includes a first part 13 having a narrower width or thinner thickness. A direction in which the current extraction portion 10b extends from the power receiving portion 10a is defined as a first direction and a direction orthogonal to the first direction is defined as a second direction. The first part 13 having a narrower width or thinner thickness is a part whose length is shorter than the average length of the extraction portion body 10b1 in the second direction. The first part 13 may be a part narrower than a width of the boundary portion of the current extraction portion 10b, the boundary portion being located between the current extraction portion 10 and the power receiving portion 10a. The first part 13 may be a part thinner than the thickness at the boundary portion of the current extraction portion 10b. In FIG. 3, the first direction coincides with the array direction x, and the second direction coincides with the width direction y of the cell. Hereinafter, description will be given, assuming that the width direction y of the cell is the second direction.

The first part 13 has lower rigidity than that of other parts of the extraction portion body 10b1 and easily deforms. According to the cell stack device 1 including the current extraction portions 10b such as those described above, displacement of the cells 2, displacement of the cell stack device 1, or displacement of the cables can be absorbed by the first parts 13. In other words, according to the cell stack device 1, even if a displacement occurs in the relative positions of the cells 2 and the power receiving portions 10a, and the through holes 12 in a state in which the through holes 12 of the connecting portions 10b2 are fixed to current extraction cables, the displacement can be absorbed by the first parts 13.

For example, even in a case in which a displacement in a vertical and/or horizontal direction, particularly, a displacement in the width direction y among the horizontal directions in the current extraction portions 10b occurs due to the cells 2 or the cell stack device 1, in the state in which the through holes 12 of the connecting portions 10b2 are fixed to cables, the generated displacement is absorbed by the first parts 13, so that the through holes 12 located at the tip of the current extraction portions 10b are less likely to be displaced, according to the cell stack device 1 of the present disclosure. Even in a case in which a displacement occurs in the current extraction portion 10b due to the cables, in a state in which the through holes 12 of the connecting portions 10b2 are fixed to the cables, the cells 2 and the power receiving portions 10a are less likely to be displaced, according to the cell stack device 1.

As described above, according to the cell stack device 1, the effects on the sealing property of the sealing material S, the sealing property around the cables in the housing container, and the like can be reduced. In particular, when the width of the current extraction portion 10b is large, such an action by the first part 13 becomes greater.

As the material of the conductive member 10, a material having electrical conductivity such as, for example, a thermal resistance alloy may be used. By using a material having electrical conductivity for the material of the conductive member 10, the current generated by the power generation of the cell 2 can be collected. Note that the material of the conductive member 10 may include on the surface thereof a film having thermal resistance as necessary.

The current extraction portion 10b may be appropriately disposed at a position corresponding to the shape and the like of the cell 2. In the example in FIG. 2, the current extraction portion 10b is located below the power receiving portion 10a.

The cells 2 illustrated in FIG. 1 are so-called vertically striped cells each having the element portion 5 and the interconnector 6 on two respective opposing flat surfaces of the conductive support body 4 having a hollow flat plate shape. The cells 2 may be so-called horizontally striped cells including a plurality of the element portions 5 on the surface of an insulating support body having a hollow flat plate shape, and the plurality of element portions 5 are connected in series. The cells 2 may have other shapes, for example, a cylindrical shape or a flat plate shape.

In the cell stack 8, the cells 2 having a flat plate shape may be stacked on each other. In FIG. 2, the current extraction portion 10*b* extending in the array direction x, in other words, a direction perpendicular to the first flat surface and the second flat surface of the cells 2 is illustrated. However, for example, in the case of the cell stack 8 in which the cells 2 each having a flat plate shape are stacked on each other, the current extraction portion 10*b* may extend in the surface direction of the cells 2 having a flat plate shape.

The conductive member 10 illustrated in FIG. 2 includes the anchoring portion 10*c* to be fixed to the gas tank 3; however, the conductive member 10 need not necessarily be fixed to the gas tank 3. In a case in which the conductive member 10 includes the anchoring portion 10*c*, the anchoring portion 10*c* is not limited to having the flat plate shape or the columnar shape as illustrated in FIG. 2, and the shape viewed from the length direction z may be, for example, an L shape, a U shape, or the like. When the shape of the anchoring portion 10*c* viewed from the length direction z is an L shape, a U-shape, or the like, the rigidity of the anchoring portion 10*c* is increased. The anchoring portion 10*c* having such a shape can be firmly fixed by the gas tank 3.

The width of the first part 13 may be appropriately set so that the first part 13 is more easily deformed than parts other than the first part 13 according to the width of the current extraction portion 10*b*. The width of the first part 13 may be, for example, smaller than a width W0 of the boundary portion of the current extraction portion 10*b*, the boundary portion being located between the current extraction portion 10*b* and the power receiving portion 10*a*. A minimum width W1 of the first part 13 may be equal to or more than 0.3 times and equal to or less than 0.8 times the width W0 of the boundary portion of the current extraction portion 10*b*, the boundary portion being located between the current extraction portion 10*b* and the power receiving portion 10*a*. The width of the first part 13 may be smaller than the average width of the current extraction portion 10*b*.

The thickness of the first part 13 may be the same as that of other parts of the current extraction portion 10*b*. The thickness of the first part 13 may be thicker than that of other parts of the current extraction portion 10*b*. When the thickness of the first part 13 is thicker than that of other parts of the current extraction portion 10*b*, a larger current can be extracted even if the width of the first part 13 is narrow. The thickness of the first part 13 may be thinner than that of other parts of the current extraction portion 10*b*. In other words, the width of the first part 13 may be smaller than the width of other parts of the current extraction portion 10*b*, and at the same time the thickness of the first part 13 may be smaller than the thickness of other parts of the current extraction portion 10*b*. When the thickness of the first part 13 is thinner than that of other parts of the current extraction portion 10*b*, particularly, a displacement in the vertical direction can be easily absorbed. The first part 13 may have the same width as that of other parts of the current extraction portion 10*b* and may be thinner than other parts of the current extraction portion 10*b*.

The first part 13 may be disposed in a region in which the distance from the boundary portion is equal to or less than half of a length L1 of the current extraction portion 10*b*, for example, as illustrated in FIG. 3. When the first part 13 is disposed in the region in which the distance from the boundary portion is equal to or less than the half of L1, a large displacement can be absorbed by the first part 13 compared to a case in which the first part 13 is disposed in a region in which the distance from the boundary portion is greater than half of L1. The first part 13 may be disposed across a region in which the distance from the boundary portion is equal to or less than half of L1 and a region in which the distance from the boundary portion is greater than the half of L1.

The first part 13 may be disposed in a region in which the distance from the boundary portion is equal to or less than half of a length L2 of the extraction portion body 10*b*1. The length L2 of the extraction portion body 10*b*1 is a length from the boundary portion to the connecting portion 10*b*2, in other words, to the through hole 12. The first part 13 may be disposed across a region in which the distance from the boundary portion is equal to or less than half of L2 and a region in which the distance from the boundary portion is greater than the half of L2.

The first part 13 may be disposed in a region in which, for example, the distance from the boundary portion is equal to or more than half of the minimum width W1 of the first part 13. The closer to the cell 2, in other words, the closer to the power receiving portion 10*a* the current extraction portion 10*b* is, the higher the temperature of the current extraction portion 10*b* is. The higher the temperature of a metal or an alloy serving as the material of the current extraction portion 10*b* is, the higher the electric resistance is. Thus, when the cross-sectional area of the first part 13 is smaller than that of other parts of the current extraction portion 10*b*, the electric resistance of the first part 13 tends to be higher when the first part 13 is disposed at a part where the temperature is high. By disposing the first part 13 in a position away from the power receiving portion 10*a*, in other words, in a region where the temperature is relatively low, the electric resistance of the first part 13 is relatively small, and consequently the electrical current that can be extracted can be increased.

Figure 4:
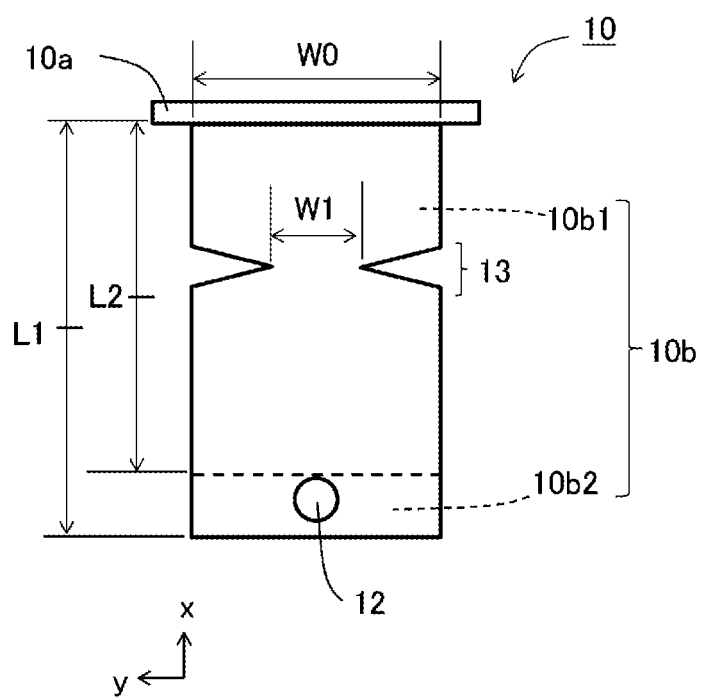
FIG. 4 is a plan view illustrating an example of the current extraction portion.
Figure 5:
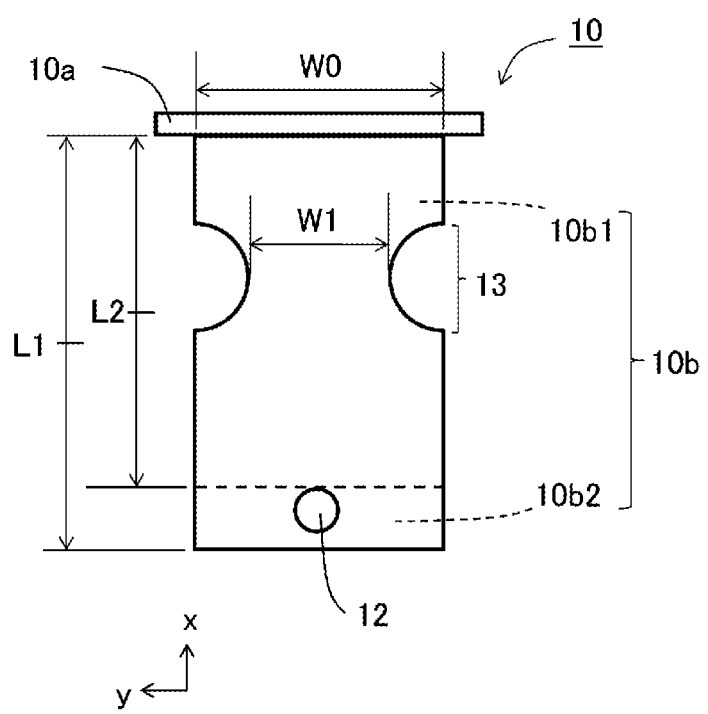
FIG. 5 is a plan view illustrating an example of the current extraction portion.

The length of the first part 13 may be set appropriately according to the cross-sectional area, shape, and the like of the first part 13. The shape of the first part 13 may be a shape in which, for example, both ends in the width direction y are notched in the extraction portion body 10*b*1 in a rectangular shape as illustrated in FIG. 3, a triangular shape as illustrated in FIG. 4, a semicircular shape as illustrated in FIG. 5, or the like. In the shapes illustrated in FIGS. 3 to 5, the center of the extraction portion body 10*b*1 in the width direction y and the center of the first part 13 in the width direction y coincide with each other.

Figure 6:
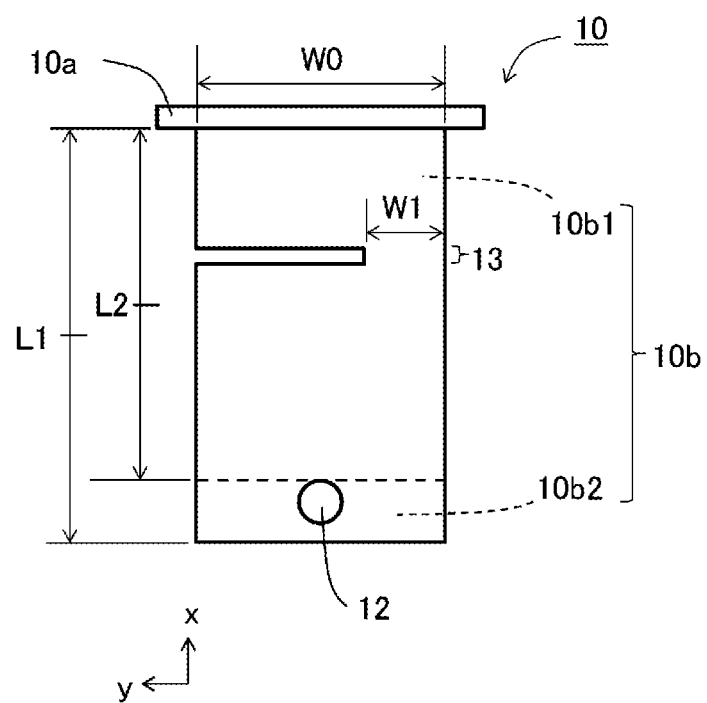
FIG. 6 is a plan view illustrating an example of the current extraction portion.

The center of the first part 13 in the width direction y need not necessarily coincide with the center of the extraction portion body 10*b*1 in the width direction y. For example, as illustrated in FIG. 6, the shape of the first part 13 may be a shape in which only one end of the two ends in the width direction y is notched in the extraction portion body 10*b*1.

Figure 7:
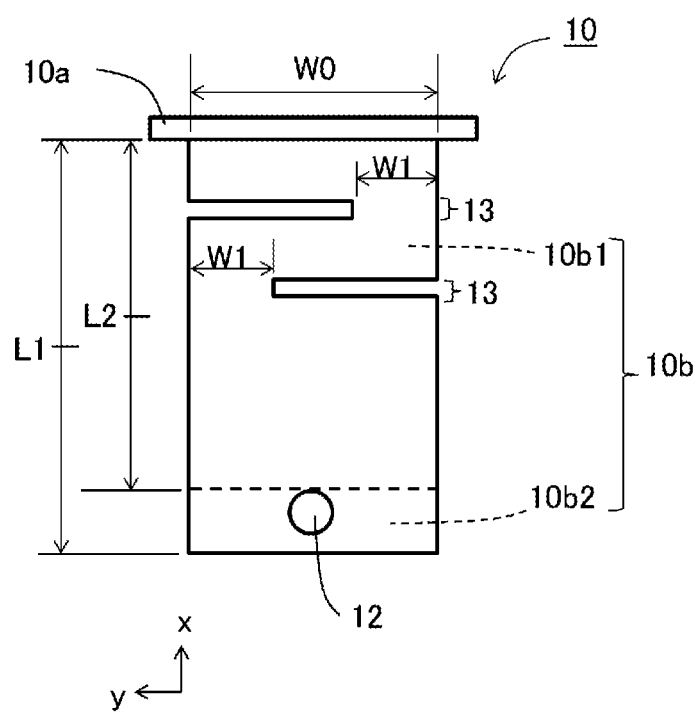
FIG. 7 is a plan view illustrating an example of the current extraction portion.

The extraction portion body 10*b*1 may also include two or more first parts 13. The two or more first parts 13 may be formed, for example, by providing notches at one end or two ends of the two ends in the width direction y at two or more positions of the extraction portion body 10*b*1 at different distances from the boundary portion. FIG. 7 illustrates an example including two first parts 13. The current extraction portion 10*b* illustrated in FIG. 7 includes notches at the two ends of the extraction portion body 10*b*1 in the width direction y, respectively. FIG. 7 illustrates an example in which a distance from the boundary portion of a notch provided at one end of the two ends in the width direction y and a distance from the boundary portion of a notch provided at the other end of the two ends differ from each other.

Corner portions of the first parts 13 may be angular, may be chamfered, or may have curved surfaces.

Figure 8:
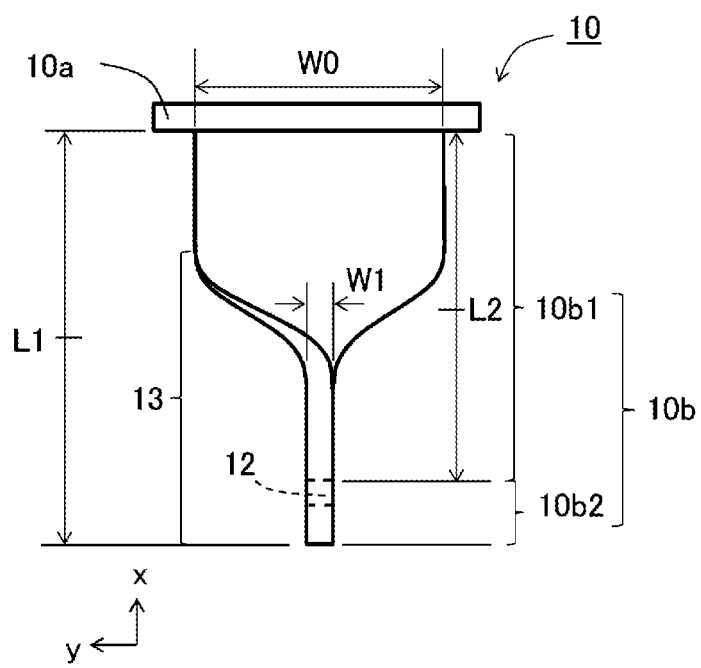
FIG. 8 is a plan view illustrating an example of the current extraction portion.

As examples of the first parts 13, FIGS. 2 to 7 illustrate shapes in which a portion of the extraction portion body 10b1 is notched; however, the first parts 13 may have other shapes. For example, the first part 13 may have a shape formed by twisting the extraction portion body 10b1 by a predetermined angle on the axis in the length direction of the extraction portion body 10b1 as illustrated in FIG. 8. For example, since the extraction portion body 10b1 having the plate shape has a thickness smaller than the width, a displacement in the thickness direction can be easily absorbed. When the extraction portion body 10b1 such as that described above is twisted, the twisted portion has a smaller length in the width direction y of the boundary portion. The twisted portion is a portion where an angle between the width direction of the portion and the width direction y of the boundary portion is greater than 0°. The twisted portion corresponds to the first part 13. For example, when the connecting portion 10b2 is twisted by 90°, in other words, ¼ rotation, with respect to the boundary portion, the thickness direction of the connecting portion 10b2 coincides with the width direction y of the cell 2, and consequently a displacement in the width direction y can be easily absorbed. As described above, the extraction portion body 10b1 having the twisted shape also has similar effects to those of the extraction portion body 10b1 having the shape in which a portion is notched. Note that the twisted portion of the extraction portion body 10b1 may be a portion of the extraction portion body 10b1.

Figure 9:
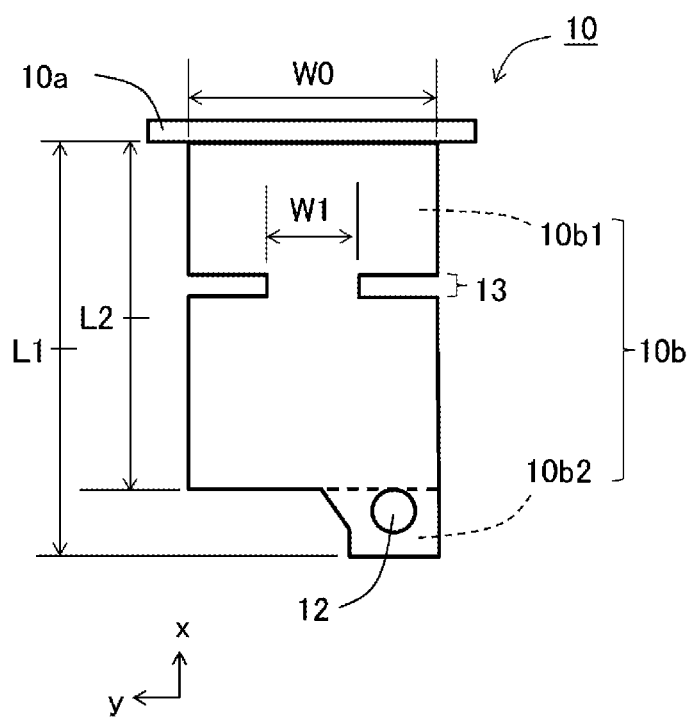
FIG. 9 is a plan view illustrating an example of the current extraction portion.

The connecting portion 10b2 may have a smaller width than that of the extraction portion body 10b1, as illustrated in FIG. 9. Since the width of the connecting portion 10b2 is smaller than the width of the extraction portion body 10b1, the degree of freedom of connection with the cable increases. The width of the connecting portion 10b2 may be larger than, the same as, or smaller than that of the first parts 13. The extraction portion body 10b1 may have a part having a width greater than the width W0 of the boundary portion in contact with the power receiving portion 10a.

In the width direction y, the center of the extraction portion body 10b1 may be at the same position as the center of the power receiving portion 10a. When the center of the extraction portion body 10b1 in the width direction y is at the same position as the center of the power receiving portion 10a, stresses applied to a pair of the anchoring portions 10c of the conductive members 10 can be equalized particularly in the cell 2 having the support body 4 having the hollow flat plate shape. The center of the connecting portion 10b2 may be at a position different from the center of the power receiving portion 10a and the center of the extraction portion body 10b1 according to the arrangement of the through hole 12 connected to the current extraction cable.

An upper end in the longitudinal direction z of the power receiving portion 10a used in the cell 2 of the vertical stripe type illustrated in FIG. 1 may be at the same position as an upper end of the cell 2 or a position higher than the upper end of the cell 2 in a state of being fixed to the gas tank 3. By setting the position of the upper end of the power receiving portion 10a at the same position as the upper end of the cell 2 or a position higher than the upper end of the cell 2, a stress generated in the cell 2 can be alleviated, and at the same time the current generated by the power generation of the cell 2 is efficiently collected by the power receiving portion 10a.

The width of the power receiving portion 10a used in the cell 2 including the support body 4 having the hollow flat plate shape may be the same as or larger than the shorter one of the width of the element portion 5 and the width of the interconnector 6. The width of the power receiving portion 10a may be the same as or larger than the width of the cell 2. Such a power receiving portion 10a can be applied to both the cell 2 of the vertical stripe type and the cell 2 of the horizontal stripe type.

Figure 10:
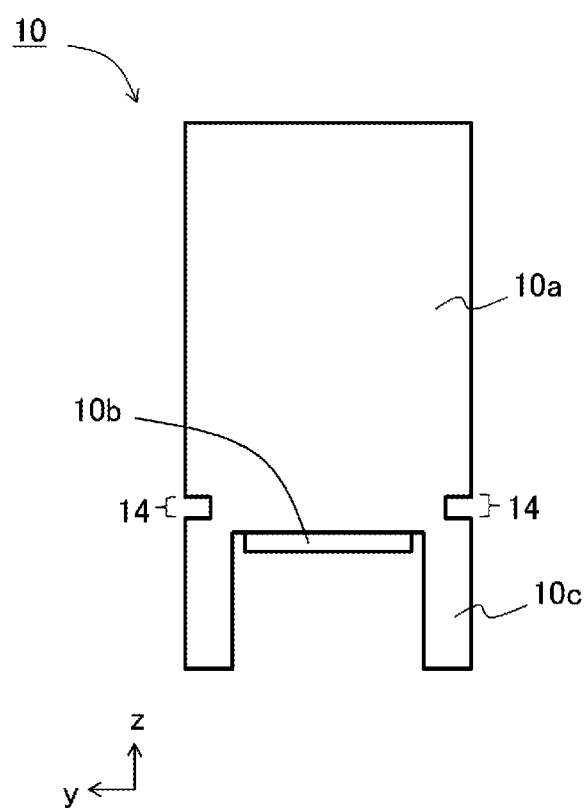
FIG. 10 is a plan view illustrating an example of the conductive member.

As illustrated in FIG. 10, the power receiving portion 10a may include a second part 14 having a narrow width. The second part 14 has lower rigidity than that of other parts of the power receiving portion 10a and easily deforms. The cell stack device 1 including the power receiving portions 10a such as those described above can absorb the displacement of the cells 2 or the displacement of the cell stack 8 by the second parts 14, and can reduce the effects on the sealing property and the like around the cables in the housing container. The second part 14 may be disposed near the current extraction portion 10b. When the second part 14 is disposed near the current extraction portion 10b, in a case in which a displacement in a vertical and/or horizontal direction, particularly, a displacement in the width direction y among the horizontal directions in the current extraction portion 10b occurs in a state in which the through hole 12 of the connecting portion 10b2 is fixed to the current extraction cable, the displacement is absorbed by the second part 14, and the through hole 12 located at the tip of the current extraction portion 10b is less likely to be displaced. As described above, the cell stack device 1 including the power receiving portion 10a including the second part 14 having a narrow width can reduce the effects on the sealing property of the sealing material S and the sealing property around the cable in the housing container. The position of the second part 14 in the length direction z may be below the element portion 5 and may be above the current extraction portion 10b. The size of the second part 14 in the length direction z may be, for example, equal to or more than 1 mm.

The cell stack device 1 may further include a protective member (not illustrated) on the outer side of the power receiving portion 10a in the array direction x. By providing the protective member on the outer side of the power receiving portion 10a, a stress due to a member such as an insulating material constituting the module is absorbed by the protective member, so that a stress on the power receiving portion 10a and the cell stack 8 is alleviated. The cell stack device 1 need not necessarily include the protective member.

The cell stack device 1 may include only one row of the cell stack 8, or may include two or more rows of cell stacks 8 connected in series. In a case in which two rows of cell stacks 8 are included, the connecting portion 10b2 of a first cell stack 8 and the connecting portion 10b2 of a second cell stack 8 may be, for example, connected by one conductive plate, or the connecting portions 10b2 may be interposed between two conductive plates. Instead of two conductive plates, the connecting portions 10b2 may be interposed in a gap of one conductive piece having a U shape or a flat annular shape, for example.

Module

Figure 11:
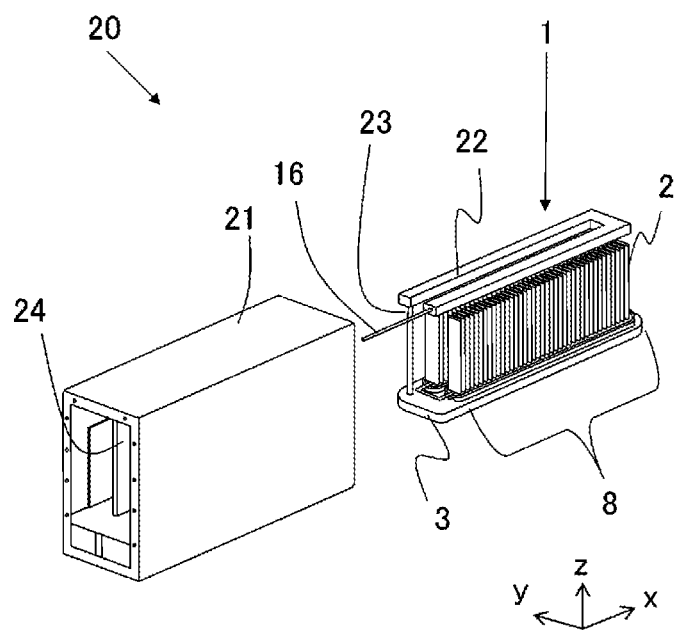
FIG. 11 is an exterior perspective view illustrating an example of a module.

FIG. 11 is an exploded perspective view illustrating an example of a module using the cell stack device 1 described above. FIG. 11 illustrates a module 20 housing the cell stack device 1 inside a housing container 21 having a rectangular parallelepiped shape. The module 20 in FIG. 11 includes a reformer 22 disposed above the cell stack 8. The reformer 22 is configured to reform a raw fuel such as natural gas or kerosene to produce the fuel gas. The fuel gas reformed by the reformer 22 is supplied to the gas tank 3 through the gas flow pipe 23, and is supplied from the gas tank 3 to the gas flow passages 7 inside the cells 2. The module 20 need not necessarily include the reformer 22.

FIG. 11 illustrates a state in which covers of front and back faces, which are a part of the housing container 21, are detached, and the cell stack device 1 housed inside the housing container 21 is removed to the rear. The module 20 illustrated in FIG. 11 can house the cell stack device 1 by sliding the cell stack device 1 in the housing container 21.

The housing container 21 includes an oxygen-containing gas introduction member 24 inside the housing container 21. The oxygen-containing gas introduction member 24 in FIG. 11 is disposed between the cell stacks 8 in a state in which the cell stack device 1 is housed in the housing container 21. The oxygen-containing gas introduction member 24 supplies the oxygen-containing gas to the lower end portion of each of the cells 2. The oxygen-containing gas flows from the lower end portion toward the upper end portion along the side of the cell 2 in accordance with the flow of the fuel gas by the oxygen-containing gas introduction member 24. The fuel gas discharged from the gas flow passages 7 of the cell 2 to the upper end portion of the cell 2 is mixed with the oxygen-containing gas and combusted. The fuel gas discharged at the upper end portion of the cell 2 is combusted, so that the temperature of the cell 2 is increased, and the activation of the cell stack device 1 can be accelerated. The fuel gas is combusted at the upper end portion of the cell 2, and consequently the reformer 22 disposed above the cell 2 is heated, thereby enabling a reformation reaction to efficiently take place in the reformer 22.

Since the module 20 includes the cell stack device 1 that includes the first part 13 and can reduce the effects on the sealing property of the sealing material S and the sealing property around the cable in the housing container 21, the module 20 can have a high long-term reliability.

Module Housing Device

Figure 12:
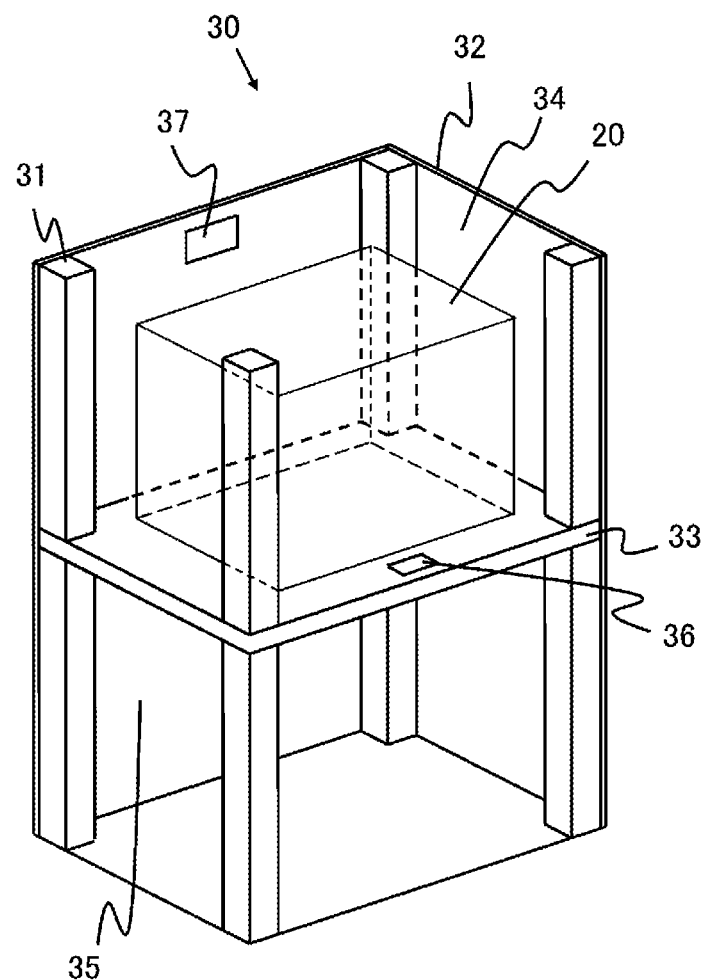
FIG. 12 is an exploded perspective view illustrating an example of a module housing device.

FIG. 12 is an exploded perspective view illustrating an example of a module housing device 30. The module housing device 30 illustrated in FIG. 12 includes an external case, the module 20 illustrated in FIG. 11, and an auxiliary device (not illustrated). The auxiliary device runs the module 20. The module 20 and the auxiliary device are housed in the external case. Note that illustration of a part of the configuration is omitted in FIG. 12.

The external case of the module housing device 30 illustrated in FIG. 12 includes a support 31 and an external plate 32. A dividing plate 33 partitions the inside of the external case into upper and lower portions. The space above the dividing plate 33 of the inside of the external case is a module housing chamber 34 that houses the module 20. The space below the dividing plate 33 of the inside of the external case is an auxiliary device housing chamber 35 that houses the auxiliary device running the module 20. Note that in FIG. 12, illustration of the auxiliary device to be housed in the auxiliary device housing chamber 35 is omitted. The auxiliary device includes, for example, a water supplying device supplying water to the module 20, a supply device supplying a fuel gas or air, and the like.

The dividing plate 33 includes an air flow opening 36 for enabling air in the auxiliary device housing chamber 35 to flow into the module housing chamber 34. The external plate 32 configuring the module housing chamber 34 includes an exhaust opening 37 for exhausting air in the module housing chamber 34.

Since the module housing device 30 includes the module 20 having high long-term reliability as described above, the module housing device 30 having high long-term reliability can be obtained.

The present disclosure has been described in detail above. However, the present disclosure is not limited to the embodiments described above, and various modifications or improvements can be made without departing from the essential spirit of the present disclosure.

For example, in the cell stack device 1 described above, an example in which the fuel gas is supplied to the gas flow passages 7 in the cells 2 and the oxygen-containing gas is supplied to the outside of the cells 2 is illustrated. However, a configuration in which the oxygen-containing gas is supplied to the gas flow passages 7 and the fuel gas is supplied to the outside of the cells 2 may be employed.

In addition, the fuel cell, the fuel cell stack device, the fuel cell module, and the fuel cell device are respectively illustrated as an example of "a cell", "a cell stack device", "a module", and "a module housing device". However, in another example, the fuel cell stack device, the fuel cell module, and the fuel cell device may be "an electrolysis cell", "an electrolysis cell stack device", "an electrolysis module", and "an electrolysis device", respectively.

EXAMPLES

A stainless steel plate having a thickness of 1.0 mm was prepared as the conductive member. A current extraction portion having a length of 35 mm was formed on the conductive member. The current extraction portion of a first example had a width of 8 mm and the current extraction portion of a second example had a width of 21 mm. In a third example, a conductive member provided with a pair of slits each having a length of 6.5 mm in the width direction y from two ends in the width direction y of the current extraction portion having a width of 21 mm toward the center and including a first part having a narrow width in the current extraction portion was formed. Each slit in the third example was provided at a position where the distance from a boundary portion was 15 mm. The length of the extraction portion body of each current extraction portion was 20 mm, and each of the through holes 12 was formed in a corresponding connecting portion on the outer side of the extraction portion body. The width of the slit, in other words, the gap between two sides of the extraction portion body facing each other across the slits, was approximately 1.0 mm in the unloaded state.

In each conductive member, the amount of voltage drop when a current of 13 A was passed was measured. While the amount of voltage drop in the first example was 36 mV, the amount of voltage drop in the second example was 14 my, and the amount of voltage drop in the third example was 17 mV, which were small.

The power receiving portion of each conductive member was fixed, and the movable range in the width direction y of the through hole was checked. The movable range of each through hole was ±2.0 mm for the first example, ±0.1 mm for the second example, and ±1.8 mm for the third example.

As described above, in the conductive member having the first part having the narrow width in the current extraction portion, the current extraction portion has a wide width, and consequently a large current can be extracted. Such a conductive member has a large movable range, so that, even if displacement occurs in the cells or the cell stack device, the first part can absorb the displacement.

REFERENCE SIGNS LIST

1 Cell stack device
2 Cell

3 Gas tank
4 Support body
5 Element portion
6 Interconnector
7 Gas flow passage
8 Cell stack
9a Current collector member
9b End portion current collector member
10 Conductive member
10a Power receiving portion
10b Current extraction portion
12 Through hole
13 First part
20 Module
30 Module housing device

The invention claimed is:

1. A cell stack device comprising:
a cell stack constituted by arraying and electrically connecting cells; and
a pair of conductive members respectively located at two ends of the cell stack in an array direction of the cells and electrically connected to the cells,
each of the pair of conductive members comprising
a power receiving portion facing the cell stack, and
a current extraction portion extending from the power receiving portion,
the current extraction portion comprising an extraction portion body and a connecting portion to be connected to an external device,
wherein when a direction in which the current extraction portion extends from the power receiving unit is defined as a first direction, the current extraction portion has a length in the first direction, and when a direction orthogonal to the first direction is defined as a second direction, the current extraction portion has a width in the second direction, the extraction portion body comprises a first part having a shortest width in the second direction shorter than the width of the current extraction portion and a length in the first direction shorter than an average length of the extraction portion body in the first direction.

2. The cell stack device according to claim 1, wherein the first part is at least located in a region in which a distance from the power receiving portion is equal to or less than half of a length L1 of the current extraction portion in the first direction.

3. The cell stack device according to claim 1, further comprising:
two or more of the first parts.

4. A module comprising:
a housing container; and
the cell stack device according to claim 1 housed in the housing container.

5. A module housing device comprising:
an external case; and
the module according to claim 4 housed in the external case.

6. A cell stack device comprising:
a cell stack constituted by arraying and electrically connecting cells; and
a pair of conductive members respectively located at two ends of the cell stack in an array direction of the cells and electrically connected to the cells,
each of the pair of conductive members comprising
a power receiving portion facing the cell stack, and
a current extraction portion extending from the power receiving portion,
the current extraction portion comprising an extraction portion body and a connecting portion to be connected to an external device,
wherein when a direction in which the current extraction portion extends from the power receiving unit is defined as a first direction, the current extraction portion has a length in the first direction, and when a direction orthogonal to the first direction is defined as a second direction, the current extraction portion has a width in the second direction, the extraction portion body comprises a first part having a shortest width in the second direction shorter than an average length of the extraction portion body in the first direction.

7. The cell stack device according to claim 6, wherein the first part is at least located in a region in which a distance from the power receiving portion is equal to or less than half of a length L1 of the current extraction portion in the first direction.

8. The cell stack device according to claim 6, further comprising:
two or more of the first parts.

9. A module comprising:
a housing container; and
the cell stack device according to claim 6 housed in the housing container.

10. A module housing device comprising:
an external case; and
the module according to claim 9 housed in the external case.

* * * * *